United States Patent [19]

Guest et al.

[11] Patent Number: 5,013,608
[45] Date of Patent: May 7, 1991

[54] HIGHLY TINTABLE ABRASION RESISTANT COATINGS

[75] Inventors: Allen M. Guest, Chino; Martin W. Preus, Anaheim; William Lewis, Tustin, all of Calif.

[73] Assignee: Swedlow, Inc., Garden Grove, Calif.

[21] Appl. No.: 376,692

[22] Filed: Jul. 7, 1989

[51] Int. Cl.$^5$ .................... B32B 17/10; B32B 27/42
[52] U.S. Cl. ........................... 428/436; 8/495; 8/496; 427/164; 427/165; 427/387; 427/393.5; 428/412; 428/480; 428/501; 428/526
[58] Field of Search .................. 106/282.12; 427/162, 427/164, 165, 387, 393.5; 428/412, 436, 480, 501, 526; 8/495, 496; 524/267, 359, 597

[56] References Cited

U.S. PATENT DOCUMENTS

| | | | |
|---|---|---|---|
| 4,218,508 | 8/1980 | Humphrey, Jr. | 428/331 |
| 4,232,088 | 11/1980 | Humphrey, Jr. | 428/412 |
| 4,275,118 | 6/1981 | Baney | 428/412 |
| 4,299,746 | 11/1981 | Frye | 106/287.12 X |
| 4,339,503 | 7/1982 | Rukavina | 428/412 |
| 4,353,959 | 10/1982 | Olson | 428/331 |
| 4,355,135 | 10/1982 | January | 524/767 |
| 4,410,594 | 10/1983 | Olson | 428/412 |
| 4,439,494 | 3/1984 | Olson | 428/412 |
| 4,476,281 | 10/1984 | Vaughn, Jr. | 524/767 |
| 4,680,232 | 7/1987 | Factor | 428/412 |
| 4,799,963 | 1/1989 | Basil | 106/287.13 |
| 4,842,941 | 6/1989 | Devins et al. | 427/40 X |

Primary Examiner—Michael Lusignan
Attorney, Agent, or Firm—Pretty, Schroeder, Brueggemann & Clark

[57] ABSTRACT

Abrasion resistant, tintable coating compositions which are based on siloxane/silica hybrid coating resins and which also contain at least about 3 percent but less than about 20 percent of a tintability enhancing compound selected from the group consisting of polyhydroxyl-functional compounds and butylated urea formaldehyde compounds. These coating compositions are especially useful for providing both abrasion resistance and high levels of tinting and, optionally, absorbance of ultraviolet radiation. Tetrahydroxybenzophenone is a preferred tintability enhancing compound that also absorbs UV light.

53 Claims, No Drawings

HIGHLY TINTABLE ABRASION RESISTANT COATINGS

BACKGROUND OF THE INVENTION

1. Field of the Invention

The present invention relates to tintable, abrasion resistant coatings for solid substrates. The substrates are generally substantially transparent to at least some wavelengths of visible light and either at least partly transparent to ultraviolet radiation or deleteriously affected by ultraviolet radiation. The cured coatings of the invention simultaneously resist abrasion and provide superior tintability. In a preferred embodiment, the cured coating may also block substantially all incident ultraviolet radiation from reaching or passing through the substrate, thereby protecting the substrate and items behind the substrate from ultraviolet radiation.

2. Description of Related

Many solid substrates, especially clear, transparent plastic materials, have been used as substitutes for glass in many applications. The reasons for this substitution are the unique properties of the plastics such as weight, ease of handling, and ease of formation of articles.

Plastic materials are not without shortcomings, however, as most plastics are soft and scratch quite readily, and may be degraded by ultraviolet light. To enable the use of plastics in some applications, it has been customary to coat the plastics with organic or siloxane coatings. These coatings preferably are clear, unpigmented coatings. An example of such an organic coating is a heat curable polyurethane resin. Because polyurethane coatings are less expensive, they are considered to be acceptable for coating plastic materials to render them abrasion resistant even though the abrasion resistance of polyurethane coatings is not as good as some siloxane-based coatings.

In order to provide exceptionally hard abrasion resistant coatings to the plastic article manufacturers, new siloxane-based curable resin systems were developed. An example of such a resin system can be found in U.S. Pat. No. 3,986,997. These siloxane resins have been very successful as coatings for plastic lenses, sheets, and other articles. These coatings, however, have two major drawbacks. After curing, they are not tintable and they are transparent to ultraviolet radiation.

It is often desirable for an end application of plastic materials that the abrasion resistant coatings applied thereto be tintable. Such uses, for example, include plastic sunglass lenses. It would be highly desirable, therefore, to find a method for tinting known resins, or to develop a new resin system in which the cured coating is tintable and, at the same time, provides excellent abrasion resistant properties such as that found in siloxane-based coatings.

Others have attempted to produce tintable, abrasion resistant coatings with limited success. For example, U.S. Pat. No. 4,355,135 to January, is directed to a tintable abrasion resistant coating composition for lenses. The coating compositions were tested by measuring the light transmission through the coated lens after immersion in a dye bath for 5, 15 and 30 minutes. While these compositions are tintable, they do not, however, provide the level or speed of tinting desired in many applications. In addition, although the January patent mentions the possibility that ultraviolet absorbers in general can be an "additive" to the abrasion resistant coating, the patent does not suggest that such unexpected and surprisingly improved tintability can be obtained from the coating compositions of the present invention, nor does it suggest the excellent ultraviolet absorbance that can be achieved by the present invention.

Ultraviolet or "UV" light has long been known to have a deleterious effect on certain transparent plastic materials and has also been known to degrade such items as furniture, drapes, upholstery, tapestries, paintings and other artwork, and automobile interiors. For example, ultraviolet radiation from sunlight passing through windows can often damage curtains, drapes, upholstery and other interior or indoor items in a house or automobile. Since light transmission is a desired part of a window's function, any attempt to block or attenuate all incident light, including visible light, is generally unwanted.

Similarly, in order to protect such items as fine art from the deleterious effects of ultraviolet radiation, they are often kept in a darkened or dimly-lit environment and protected by a covering sheet of glass or plastic. This covering sheet may be coated with a compound that absorbs ultraviolet light or an ultraviolet light absorbing compound may be incorporated into the covering sheet. Unfortunately, the aesthetics of the underlying product may suffer from scratches in the surface of the covering sheet and from the darkened environment.

There also has been concern in the ophthalmics industry about the effect of "UV-A" solar radiation, i.e., from 340–400 nm, as a cause of cataracts. Various strategies have been used to provide screening in the UV-A region for eyeglass lenses, whether they are glass or plastic. Darkened sunglasses cause the pupil to dilate in response to the lowered light. This makes the eye more susceptible to radiation at all wavelengths. The presence of an effective UV screen for the UV-A region in an ophthalmic coating, coupled with high abrasion resistance and tintability, would be highly desirable since it would provide protection of the eyes as well as other desirable properties.

One possible solution to the problem of obtaining both a high degree of UV absorption and abrasion resistance is to incorporate a large amount of a UV absorber into an abrasion resistant coating composition. Unfortunately, the low compatibility of UV absorber compounds in abrasion resistant coating compositions can lead to loss of adhesion, transparency, or abrasion resistance, and has prevented the development of a single composition that has both high abrasion resistance and excellent UV absorption at a reasonable cost.

Accordingly, the need exists for a single coating composition that, when cured, can accomplish the objectives of high tintability, combined with significant resistance to abrasion and, optionally, the ability to absorb ultraviolet radiation.

SUMMARY OF THE INVENTION

It is, therefore, an object of this invention to provide a single coating composition that can provide both resistance to abrasion and improved tintability when cured and, in a preferred embodiment, the ability to absorb significant amounts of ultraviolet radiation as well. An additional object of the invention is to provide a process for making the coating composition, for coating a solid with the coating composition of the invention, and to provide a substrate coated with the coating composition of the invention. Objects of the invention also include providing a method of protecting an object by placing a substrate coated with the coating composition of the present invention between a source of ultraviolet radiation and the object, and of protecting the substrate itself by coating it on at least one side with the coating composition of the invention and curing the composition.

These and other objects of the present invention are achieved through a coating composition containing at least about 3 percent but less than about 20 percent by weight of coating solids of a tintability enhancing compound in a base resin comprising an aqueous, aqueous-alcoholic, or alcoholic dispersion of colloidal silica, or of a mixture of colloidal silica with one or more colloidal metal oxides, and a partial condensate of an epoxy-functional silanol which is preferably blended with a partial condensate of another silanol. A crosslinking agent and a curing catalyst are added to form the highly tintable abrasion resistant coating compositions of the present invention.

The tintability enhancing compounds are selected from the group consisting of polyhydroxyl-functional compounds and butylated urea formaldehyde compounds. The polyhydroxyl-functional compounds include tetrahydroxybenzophenone, dihydroxybenzophenone, polyethylene glycols, polypropylene glycols, polyether polyols, and polyester polyols. A preferred butylated urea formaldehyde compound is BEETLE 80, available from American Cyanamide Company in Wayne, N.J. Tintability enhancing compounds that are also UV absorbers, such as tetrahydroxybenzophenone, are particularly preferred in the coating compositions of the present invention. Surprisingly, the coating composition of the invention is capable of incorporating up to about 20 percent by weight, based on coating solids, of the tintability enhancing compound without significant deterioration in the physical properties of the cured coating. Preferably, the tintability enhancing compound is present in an amount between about 5 percent to about 15 percent by weight, based on coating solids. Thus, when using a UV absorber such as tetrahydroxybenzophenone, excellent abrasion resistance and an extremely high amount of protection from ultraviolet radiation may be obtained either independently of, or along with, excellent tintability.

The process for making the coating of the invention comprises mixing an aqueous, aqueous-alcoholic, or alcoholic dispersion of colloidal silica, or of a mixture of colloidal silica with one or more colloidal metal oxides, with a partial condensate of an epoxy-functional silanol which is preferably blended with a partial condensate of another silanol, and adding a crosslinking agent, a curing catalyst and at least about 3 percent but less than about 20 percent by weight of a tintability enhancing compound, such as tetrahydroxybenzophenone. The prepared coating composition is applied to at least one face of a substrate such as glass or plastic and cured by exposure to heat, light, an electron beam or some other curing agent. The coated substrate may then be exposed to a conventional tinting process to tint the cured coating.

DETAILED DESCRIPTION OF THE INVENTION

The present invention comprises a tintable, curable, abrasion resistant coating composition that may also provide protection from ultraviolet radiation. The composition comprises:

(A) a base resin consisting of an aqueous-alcoholic dispersion of
  (1) about 5 to about 75 weight percent, based on the total solids content of (A), of colloidal silica or a mixture of colloidal silica with a colloidal metal oxide;
  (2) 0 to about 50 weight percent, based on the total solids content of (A), of a partial condensate of a silanol or a blend of silanols which is selected from a group consisting of silanols having the formula (a) $R^1Si(OH)_3$ wherein $R^1$ is methyl, and (b) $R^2Si(OH)_3$ wherein $R^2$ is selected from the group consisting of vinyl, allyl, phenyl, ethyl, propyl, 3,3,3-trifluoropropyl, gamma-methacryloxypropyl, gamma-mercaptopropyl, and gamma-chloropropyl and wherein, when (b) is selected, the amount of (b) in (A) cannot exceed about 10 weight percent based on the total solids content of (A);
  (3) about 10 to about 55 weight percent, based on the total solids content of (A), of a partial condensate of a silanol of the formula $R^3Si(OH)$, wherein $R^3$ is selected from the group consisting of epoxy-functional compounds and mixtures thereof, preferably, (a)

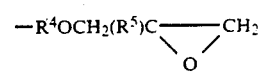

wherein $R^4$ is an alkylene radical containing 1 to 4 carbon atoms and $R^5$ is a hydrogen atom or an alkyl radical of 1 to 2 carbon atoms, and (b)

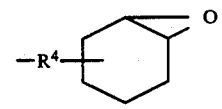

wherein $R^4$ has the meaning set forth above;
(B) a crosslinker for (A);
(C) a curing catalyst; and
(D) at least about 3 percent but less than about 20 percent by weight, based on the total solids content of (A), (B), (C) and (D), of a tintability enhancing compound selected from the group consisting of polyhydroxyl-functional compounds and butylated urea formaldehyde compounds.

The coating compositions described above may be used alone or in conjunction with other abrasion resistant coating compositions. The dilution of the coating composition of the present invention in other abrasion resistant coating compositions, however, should be controlled so that the tintability of the coating does not fall below a desired level.

The present invention also comprises a process for coating solid substrates with the compositions described herein. The process comprises coating a solid substrate with the coating composition of the invention and thereafter curing the composition on the substrate by first evaporating the solvent and then heating to temperatures of 50° C. or higher. The coating composition may also be cured by light or electron beam radiation.

A third aspect of the present invention is a solid substrate coated by the composition of the invention, while a fourth aspect of the invention is a method for protecting an item from ultraviolet light by coating a substrate with the coating composition of the invention.

The base resin (A) of the present invention comprises three components: (A)(1) is colloidal silica, alone or in combination with a metal oxide colloid; (A)(2) is a partial condensate of a silanol of the formula $R^1Si(OH)_3$ or $R^2Si(OH)_3$, or both; and (A)(3) is a partial condensate of a silanol of the formula $R^3Si(OH)_3$. For purposes of this invention, the term "colloidal silica" refers to stable dispersions or solutions of discrete particles of amorphous silica. This term excludes solutions of polysilicic acid in which the polymer molecules or particles are so small that they are not stable. Such solutions, which can be obtained by acidifying sodium silicate solutions or by hydrolyzing silicon esters or halides at ordinary temperatures, can be used herein provided their size is increased either by polymerization or aggregation such that the average particle size is about 1 to about 150 millimicrons in diameter. Preferred for this invention are commercial aqueous colloidal silica dispersions having a particle size in the range of about 5 to about 100 millimicrons in diameter. These silica dispersions are well-known commercial dispersions and are sold under such registered trademarks as "Ludox" and "Nalcoag". Alternatively, alcoholic or other organic dispersions of colloidal silica may also be used. It is preferred to use colloidal silica of about 10 to about 30 millimicrons in diameter particle size in order to obtain the greatest stability. This component is generally used at about 5 to about 75 weight percent based on the total solids content of the base resin (A).

The metal oxide colloids which can be dispersed in the aqueous/alcohol solution in combination with the colloidal silica include antimony, cerium, and titanium oxides. A suitable colloidal antimony oxide is commercially available under the tradename "Nyacol A1510LP" from Nyacol, Inc. in Ashland, Mass. Colloidal metal oxide dispersions function to improve the hardness of the coating and may also assist in absorbing ultraviolet light. Similar colloidal dispersions of other metal salts are expected to be suitable in the practice of this invention and obvious to one having ordinary skill in the art. The common characteristic of these colloidal dispersions is that the dispersant is water insoluble.

Preferably, the base resin includes as a second component a partial condensate of a silanol or a blend of silanols having the formula $R^1Si(OH)_3$ or $R^2Si(OH)_3$, or both. When the silanol has the formula $R^1Si(OH)_3$, $R^1$ is methyl. When the silanol has the formula $R^2Si(OH)_3$, $R^2$ is selected from the radicals 3,3,3-trifluoropropyl, vinyl, allyl, phenyl, ethyl, propyl, gamma-methacryloxypropyl, gamma-mercaptopropyl, and gamma-chloropropyl, provided that when the silanol includes $R^2Si(OH)_3$, the amount of this silanol in (A) cannot exceed about 10 weight percent based on the total solids content of (A). This second component is generally used at 0 to about 50 weight percent based on the total solids content of (A).

The third component of the base resin (A) is a partial condensate of a silanol of the formula $R^3Si(OH)_3$ wherein $R^3$ is selected from the group consisting of epoxy-functional compounds and mixtures thereof. Preferred epoxy-functional compounds are selected from the two groups consisting of (a), a radical having the formula:

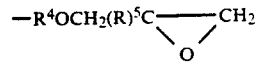

and (b) a radical having the formula

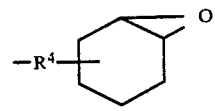

wherein $R^4$ is an alkylene radical containing 1 to 4 carbon atoms and $R^5$ is a hydrogen atom or an alkyl radical of 1 or 2 carbon atoms. It should be noted that the common feature of these two groups is the presence in each of the epoxy functionality. This component is generally used at about 10 to about 5 weight percent based on the total solids content of (A).

Most preferred for this invention is a base resin which contains from about 30 to about 70 weight percent of (A)(1), from about 5 to about 25 weight percent of (A)(2), and from about 20 to about 40 weight percent of (A)(3), all based upon the total solids content of (A).

The colloidal silica and metal oxide colloids used in this invention are preferably aqueous-suspensions and the inventive compositions are preferably aqueous-alcoholic dispersions. The preparation of the base resin (A) is, therefore, carried out in an aqueous media. Because the starting materials are prepared from esters, alcohols are generally part of the solvent system. The partial condensates set forth above as (A)(2) and (A)(3) are obtained from the condensation of $R^1Si(OH)_3$ or $R^2Si(OH)_3$, or both, and $R^3Si(OH)_3$, which in turn are usually obtained from precursor trialkoxysilanes, for example $R^1Si(OCH_3)_3$ and $R^2Si(OCH_3)_3$. As described in detail in U.S. Pat. No. 4,355,135 to January, $R^1Si(OH)_3$, $R^2Si(OH)_3$, and $R^3Si(OH)_3$, are preferably generated in-situ by adding the corresponding trialkoxysilanes to aqueous dispersions of colloidal silica. Suitable trialkoxysilanes include those containing methoxy, ethoxy, propoxy and butoxy substituents which, upon hydrolysis in the aqueous medium, liberate the corresponding alcohols, thus generating at least a portion of the alcohol present in the base resin. Alcohol can be added to the hydrolysis medium prior to the addition of the alkoxysilanes, and mixtures of alcohols can be used herein.

Upon generation of the silanols in the aqueous medium, there is condensation of the hydroxyl groups to form siloxane bonds. Sometimes, the hydrolysis and condensation reactions can be enhanced by the addition of small amounts of acids. The condensation does not go to completion but, instead, there are a great number of hydroxyl groups on the siloxane. Optionally, it is sometimes desirable to utilize other water-soluble or water-miscible solvents in this invention, such as ketones, Cellosolves and Dowanols. Dowanols include glycol monoethers, and are manufactured by The Dow Chemical Co., Midland, Mich., U.S.A.

The final base resin solution should preferably contain about 10 to about 50 weight percent solids and may comprise either acidic or alkaline silica dispersions. More preferably, the base resin solution should contain from about 10 to about 30 weight percent solids depending on the desired consistency of the final composition.

The order of addition and hydrolysis of the components of the base resin is not critical, but more favorable properties in the base resin solution, and ultimately in the cured coating made from such a resin, are enhanced when the alkoxy-silanes of components (A)(2) and (A)(3) are combined and added to the aqueous or aqueous-alcoholic silica solution at room temperature. The base resin (A) can be used immediately after preparation or it can be stored. Sometimes, the properties of the cured film can be optimized if the base resin is allowed to age. Aging can take place slowly at room temperature over several days or aging can be shortened by heating the base resin.

Examples of the trialkoxysilane precursors of components A(2)(a) and (b) are such silanes as:

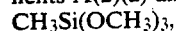 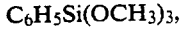
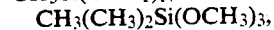
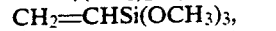
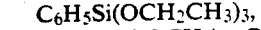

Examples of the trialkoxysilane precursors of component A(3) are

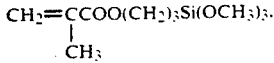

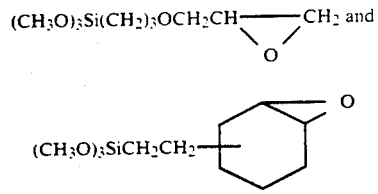

After the base resin is formed, it is mixed with components (B), (C) and (D). The order of addition of components (B), (C) and (D) to component (A) is not critical. It is, however, important that components (B), (C) and (D) are compatible with the base resin and that components (B), (C) and (D) are uniformly distributed in component (A). Non-uniformity of the mix or incompatibility of (B), (C) or (D) in (A) causes non-uniform cured films containing blotches, opaque spots or both.

Component (B), the crosslinker, is selected from the group consisting of (1) polyfunctional carboxylic acids; (2) polyfunctional anhydrides; and (3) polyfunctional imides. The amount of component (B) that is useful in this invention is based on the amount of component (A)(3) used in the invention, that is, on the equivalents of epoxy contained in (A). Thus, for example, in the case of the polyfunctional acids, (B)(1), enough acid is added to the resin to react with from about 2 to about 300 percent of the available epoxy groups in component (A). Preferred for this invention is an amount of (B) containing enough reactive acid, anhydride or imide to react with from about 25 to about 200 percent of the epoxy groups in (A). These amounts are further limited by the solubility of component (B) in component (A). In those cases where component (B) is completely insoluble in component (A), the cured film is not aesthetically pleasing and the tinting is irregular. In the present invention, some of component (B) materials are highly soluble in the base resin (A) and some are sparingly soluble in base resin (A). All such materials are considered within the scope of this invention, however, because even those materials used as component (B) that are sparingly soluble still lend valuable properties to the resins. As long as such materials are soluble in base resin (A) and as long as a curable, tintable hard film results, such materials are considered within the scope of this invention. Generally, component (B) is useful in this invention at about 0.1 to about 15 weight percent based on the weight of (A), (B) and (C).

Examples of group (1) of component (B) are such compounds as itaconic, succinic, malonic, glutaric, adipic, pimelic, suberic, azelaic and sebacic acids, and unsaturated dibasic acids such as fumeric and maleic. Examples of group (2) of component (B) include such compounds as the cyclic anhydrides of the above mentioned dibasic acids such as succinic anhydride, glutaric anhydride, trimellitic anhydride, pyromellitic anhydride, phthalic anhydride and maleic anhydride. Examples of group (3) of component (B) include such compounds as succinimide, phthalimide, glutarimide and maleimide.

The third component, (C), of this invention is a curing catalyst. For purposes of this invention, the catalyst can be selected from the group consisting of (1) metal acetylacetonates; (2) diamides; (3) imidazoles; (4) amines; (5) organic sulfonic acids and their amine salts and (6) alkali metal salts of carboxylic acids. Thus, examples of such catalysts include, for group (1), such compounds as aluminum, zinc, iron and cobalt acetylacetonates; for group (2), such compounds as dicyandiamide; for group (3), such compounds as 2-methylimidazole, 2-ethyl-4-methylimidazole and 1-cyanoethyl-2-propylimidazole; for group (4), such compounds as benzyldimethylamine, and 1,2-diaminocyclohexane; for group (5), such compounds as trifluoromethanesulfonic acid; and for group (6), such compounds as sodium acetate. For purposes of this invention, it has been found that from about 0.05 to about 5 weight percent based on the total solids in the coating composition of the catalysts described herein will cause the composition to cure. Larger amounts of such catalysts do not appear to enhance the properties of the film and such unnecessarily large quantities constitute a waste of materials.

The tintability enhancing compound, ingredient (D), is selected from the group consisting of polyhydroxyl-functional compounds and butylated urea formaldehyde compounds. The polyhydroxyl-functional compounds include tetrahydroxybenzophenone, dihydroxybenzophenone, polyethylene glycols, polypropylene glycols, polyether polyols, and polyester polyols. Preferred commercially available polyhydroxyl-functional compounds include "UVINUL D-50" and "UVINUL 400," a tetrahydroxybenzophenone and a dihydroxybenzophenone, respectively, both of which are available from BASF, Inc. in Parsippany, N.J., "TONE 301," a polyester triol available from Union Carbide Corp. in Danbury, Conn., and polyethylene glycol, preferably having a molecular weight of about 400, available from J. T. Baker, Inc. in Phillipsburg, N.J. A preferred commercially available butylated urea formaldehyde compound is "BEETLE 80," from American Cyanamid in Wayne, N.J.

Preferred tintability enhancing compounds in the coating compositions of the present invention can perform two separate functions. The primary purpose for adding a tintability enhancing compound, such as tetrahydroxybenzophenone or polyethylene glycol, to the coating compositions of the present invention is to enhance the ability of the cured coating to absorb, or transmit to the substrate, dye in a tinting operation without sacrificing the excellent abrasion resistance of the unmodified coating. Preferred tintability enhancing compounds, such as tetrahydroxybenzophenone, are also ultraviolet absorbers. This advantageously allows the cured coating of the invention to achieve both rapid tinting and, provided that the UV absorber is present in sufficient amounts, excellent ultraviolet absorbance while still maintaining excellent abrasion resistance.

Rapid tinting may be achieved with the addition of a minimum of at least about 3 percent by weight, based on total coating solids, up to about 20 percent by weight of the tintability enhancing compound. The mechanism for the enhancement of tinting is not well understood, but excellent results can be obtained. Preferably, the tintability enhancing compound is present in an amount between about 5 percent to about 15 percent by weight, based on total coating solids. If the tintability enhancing compound is to be used for ultraviolet absorbance, with or without tinting, then best results are achieved when it comprises at least about 10 percent by weight of the total coating solids up to about 15 percent by weight.

No ultraviolet absorber can provide 100 percent ultraviolet radiation absorbance in a coating composition without sacrificing other desirable properties, such as cost or transparency, etc. Accordingly, for purposes of the embodiment of the present invention in which, e.g., tetrahydroxybenzophenone acts as an ultraviolet absorber as well as a tinting enhancer, it is sufficient for the tetrahydroxybenzophenone to block a desired portion of incident ultraviolet light. The amount of incident ultraviolet light that must be blocked by the coating will, of course, vary with the use of the coating, so a fixed absorbance or percentage of ultraviolet transmission cannot be defined as "desired". For purposes of the preferred embodiment, however, an absorbance of about 1.0 (10 percent transmittance) up to at least 385 nm is preferred, and higher absorbances (lower percent transmittance) are more preferred. In the most preferred embodiment, 98 percent of all incident ultraviolet light is blocked by the coating composition.

"Ultraviolet light", as used herein, means light having a wavelength of no more than about 400 nm. For most substrates in most conditions, ultraviolet light may also be considered to have a wavelength of at least about 240 nm. Most glasses, for example, absorb ultraviolet light having a wavelength less than about 260 nm. Thus, an ultraviolet absorber need only be effective for most purposes above about 250 nm if the substrate is glass. Certain substrates, such as acrylics, will transmit ultraviolet light with a wavelength less than about 260 nm, but natural sunlight only has ultraviolet light having a wavelength higher than about 290 nm. For most purposes, therefore, ultraviolet light can be defined as having a wavelength between about 290 nm and about 400 nm. This definition, however, does not exclude light having a wavelength of less than about 290 nm.

Absorbance is also affected by coating thickness. The coatings of the present invention typically have thicknesses of less than about 10 microns. Thicker coatings, however, are not excluded from the invention.

After the base resin is prepared and the components (B), (C) and (D) are added, the composition is shelf stable and can be stored at room temperature for weeks.

When coating a substrate, the substrate is cleaned using techniques known in the art and then primed, if desired, with a preliminary coating, and the coating composition of the invention is then applied to the substrate. One advantage of the invention is that a primer coat containing an ultraviolet absorber is not essential to obtaining high levels of ultraviolet absorbance. The invention, however, does not exclude the presence of a primer coat with or without an added ultraviolet absorber. Coating can be accomplished by common coating methods such as dip coating, spraying, brushing, spin coating, roller coating, flow coating or cascading. Dip coating and other coating techniques that coat both sides of a substrate may also be used, or single side coating techniques may be repeated on the other side of a substrate if desired. These various methods of coating allow the coating to be placed on at least one side of the substrate at variable thicknesses, thus allowing a wider range of uses of the coating. Ordinarily, the coating composition of this invention performs best when the cured coating is in the range of about 1 to about 10 microns thick. Thicknesses in this range allow optimum tinting and ultraviolet absorbance in shorter times without impairing the optical clarity of the coated substrates such as by, e.g., cracking.

The coating composition and substrate are normally heated to expedite curing. Temperatures in the range of 50° C. to 150° C. can be used for most plastic substrates, provided that the time of curing and the temperature do not combine to soften and distort a selected plastic substrate. Therefore, a temperature of 80° C. to 130° C. is preferred.

The coating composition is useful when placed on a glass substrate as well as plastic. If the substrate is glass, higher curing temperatures may be used. Useful plastic substrates include, but are not limited to, polycarbonate, acrylic, CR-39, i.e., poly(diethylene glycol bis allyl carbonate), polyesters, cellulose acetate butyrate, and acrylonitrile-butadiene-styrene. Other substrates may also be used, such as copolymers of the substrates listed above, and substrates such as wood, fabric, leather, paper, or metal.

When a tinted coating is desired, the surface of a substrate coated with a cured coating of the present invention is immersed in a heated dye bath containing a suitable colored dye, e.q., BPI Sun Gray or BPI Black, both of which are dyes sold by Brain Power Incorporated of Miami, Fla. The dye solution is prepared by diluting one part of the BPI dye concentration to ten parts water, and then heating the resulting solution to a temperature in the range of about 88° to 100° C., while constantly stirring the solution. The coated surface of the substrate is preferably cleaned by wiping with a compatible solvent prior to immersion in the dye bath for a period of time sufficient to absorb or transmit the desired amount of dye, then washed with distilled water to remove the excess dye and blotted dry. The intensity of the tint can be adjusted by varying the thickness of the coating or the time immersed in the dye bath. The degree of tint obtained can be determined by using a colorimeter, such as a Gardner XL-835, which measures the percent of light transmittance.

A significant property of the coating composition of the present invention is that a high amount of dye can be absorbed or transmitted to the substrate within a reasonable length of time. For example, in the ophthalmic industry two levels of light transmittance ("LT") are generally used in connection with the application of tints to lenses for eyeglasses. A 50 percent light transmittance means that the amount of dye absorbed or transmitted is sufficient to allow only 50 percent of the light to pass through the tinted lens. This is generally the level of light transmittance applicable to "fashion" tints for eyeglasses. A darker tint such as that used for sunglasses generally has about 20 percent light transmittance which means that the amount of dye absorbed or transmitted allows only 20 percent of the light to pass through the lens. One particular type of plastic commonly used in the ophthalmic industry to make lenses, CR-39, generally will tint to 20 percent LT in approximately 15 minutes. Accordingly, it is desired that 20 percent LT with a coated lens be achieved within 15-30 minutes under standard conditions.

The coating composition of the invention may be used to protect an item behind a substrate, such as furniture or artwork, from ultraviolet light that would otherwise penetrate the substrate. The coating composition can also be used to protect the substrate itself. Certain substrates are susceptible to weathering or other degradation due to exposure to visible or ultraviolet light or both. The coating compositions of the invention can substantially reduce the amount of incident ultraviolet light reaching the substrate. Sensitive substrates include polycarbonates and some other plastics.

Certain substrates, particularly plastics, are very sensitive to certain wavelengths of visible or especially ultraviolet light, while other wavelengths have little or no effect on the substrate. In such cases, the tinting dye can be selected to provide the highest degree of absorbance at and near the critical wavelength. Thus, the composition of the invention can be tailored to meet special needs.

Coatings using the present invention may be used to protect substrates or items protected by a substrate in many different fields. Protecting eyeglass lenses, windows or interiors in vehicles or in buildings, either by direct application to the substrate or through coating a film and then applying the film to the substrate, are all methods for using the invention.

Other additives can be added to the inventive compositions in order to enhance the usefulness of the coatings. For example, surfactants, antioxidants, and the like, can be included herein.

As stated above, the coating compositions of the present invention are silica-based due to the condensation of colloidal silica and the various hydrolyzable silanes. Those skilled in the art will recognize that the relative weight percent of the colloidal silica can be varied in proportion with the remaining coating composition ingredients. The silica content can be adjusted by varying the relative amounts of the constituent components. This adjustment in silica content will, in turn, influence the physical properties of the cured coating. For example, abrasion resistance is directly related to the percent silica content, but is inversely related to the $\Delta\%H$, which is a quantitative measure of abrasion resistance on coated products according to the Taber Abrasion Resistance test, ASTM No. D 1044. That is to say, as the silica content becomes a greater percentage of the total solids in the cured coating, the value of $\Delta\%H$ will decrease for that particular coating. It will be recognized that such lower values of $\Delta\%H$ indicate improved abrasion resistance for those coatings. Generally, coatings having acceptable abrasion resistance have a $\Delta H_{500}$ (i.e., after 500 cycles) of less than about 15%.

In order to more fully and clearly describe the present invention so that those skilled in the art may better understand how to practice the present invention, the following examples are given. These are intended to illustrate the invention and should not be construed as limiting the invention disclosed and claimed herein in any manner. In each example, all parts are by weight.

TESTING METHODS

Tinting Test

The lenses were tinted using commercially available dyes from Brain Power, Inc., Miami, Fla., U.S.A., namely, BPI Sun Gray and BPI Black dyes. The tinting was carried out at either about 88° C. or about 96° C. by immersing the lenses into the dye bath for up to 30 minutes. In the tables of the examples, the indicated properties are measured after the indicated number of minutes of total lens immersion. The lower the percent of light transmitted, the greater is the amount of dye absorbed or transmitted to the lens by the coating during the selected time period.

The degree of tint obtained as shown by the percent of light transmission through the lens was measured using a Gardner XL-835 colorimeter manufactured by Gardner Laboratory, Inc., Bethesda, MD., U.S.A., and is reported as percent transmission. The colormeter also measures the degree of yellowness and the amount of haze in the coating, both of which are also reported in the tables. Typically, less than 1% haze is not visible to the naked eye, while more than 1.5% haze is generally objectionable as the optical clarity of the coated lens becomes affected.

TABER ABRASION RESISTANCE TEST

Abrasion resistance was measured using the Taber Abrasion Resistance Test, ASTM No. D 1044. The Taber Abraser generates the increase in haze after being subject to 100 and 500 cycles of an abrasive CF-10 wheel. Results are reported as percent change in haze ($\Delta\%H$).

COATING ADHESION TEST

The adhesion of the cured coating to the substrate was measured using the crosshatch adhesion test, ASTM No. D 3359. This involves scribing a criss-cross pattern (grid) on the coated surface, applying a 3M 600 tape, and pulling it away sharply in one quick motion. Three tape pulls with no adhesion loss is considered passing, and is reported as 100% adhesion.

EXAMPLE 1

To show the unexpected and surprising tinting improvement of the coating compositions of the present invention, two controls were prepared for comparison purposes. The first was an uncoated lens blank made from CR-39, a transparent polycarbonate, and the second was a CR-39 lens blank coated with SILVUE 339, a commercially available coating composition from SDC Coatings, Inc. in Garden Grove, Calif., which is made in accordance with the teachings of the January patent, U.S. Pat. No. 4,355,135. SILVUE 339 is a silica filled siloxane coating based on methyltrimethoxysilane and gamma-glycidoxypropyltrimethoxysilane. The CR-39 lens coated with SILVUE 339 was cured in an oven for 16 hours at a temperature of 77° C. and then allowed to cool to room temperature, at which time the thickness of the cured coating was measured. The initial percent light transmission, yellowness index and percent haze of both lenses were measured before and after 15 minutes of immersion into a BPI Sun Grey colored dye bath (1:10 dilution) heated to about 88° C. Coating tintability was tested by measuring the change in light transmittance (L.T.) resulting from the 15 minute immersion in the dye bath. The results given in Table I show that the uncoated CR-39 (Sample 1(a)) reduced the light transmission a significantly greater amount than the CR-39 lens coated with SILVUE 339 (Sample 1(b)).

EXAMPLE 2

To demonstrate the improved tintability of the coating compositions of the present invention, lens blanks made from CR-39 were coated with a coating composition prepared by mixing SILVUE 339 with 5 (Sample 2(a)), 10 (Sample 2(b)), and 15 (Sample 2(c)) percent by weight of UVINUL D-50. Other samples were prepared by mixing SILVUE 339 with 10% UVINUL 400 (Sample 2(d)), 10% TONE 301 (sample 2(e)), and 10% BEETLE 80 (Sample 2(f)). (All percentages are by weight total solids.) Coating thickness (in microns), percent light transmission, yellowness index, and percent haze were measured both before and after immersion for 15 minutes in a dye bath using the same procedures explained in Example 1. As the results in Table I show, the coating compositions containing tintability enhancing compounds had demonstrably superior tintability than the coated control (sample 1(b)).

TABLE I

| Sample | Coating Thickness | Initial | | | 15 Minutes | | |
|---|---|---|---|---|---|---|---|
| | | L.T. | Y.I. | Haze | L.T. | Y.I. | Haze |
| 1(a) | — | 92.8 | 0.4 | 0.2 | 12.2 | 14.7 | 0.0 |
| 1(b) | 3.2 | 93.3 | 0.6 | 0.2 | 47.6 | 12.9 | 0.3 |
| 2(a) | 3.4 | 93.4 | 1.0 | 0.0 | 32.3 | 15.0 | 0.1 |
| 2(b) | 3.3 | 93.0 | 1.6 | 0.2 | 26.8 | 14.5 | 0.1 |
| 2(c) | 3.3 | 93.3 | 1.6 | 0.1 | 12.7 | 7.1 | 0.0 |
| 2(d) | 3.4 | 93.4 | 0.8 | 0.2 | 28.6 | 18.4 | 0.1 |
| 2(e) | 2.9 | 93.4 | 0.7 | 0.0 | 12.8 | 14.7 | 0.0 |
| 2(f) | 2.8 | 93.8 | 0.8 | 0.6 | 16.6 | 14.7 | 0.4 |

EXAMPLE 3

To show the effectiveness of the ultraviolet absorbance of the present invention, coating compositions of the invention were prepared by mixing SILVUE 339 with (a) 10 percent by weight, (b) 15 percent by weight, and (c) 20 percent by weight of coating solids of UVINUL D-50. These samples were coated on glass substrates and then cured for three minutes at 204° C. The results are shown in Table II.

The absorbance of ultraviolet light was measured at 385 nm. The values of absorbance are exponentially related to the transmittance of ultraviolet light through the coating, so an absorbance of 1.0 means only 10 percent of the ultraviolet light at a wavelength of 385 nm passed through the coating, while an absorbance of 2 means only 1 percent of the ultraviolet light was transmitted. Excellent UV absorbance was obtained for each of the samples of Example 3.

The comments column of Table II contains observations on the appearance of the cured coating. Samples 3(a) and 3(b) were clear when cured, although all three samples of Example 3 had some very light yellowing due to a slight tail of absorbance by the ultraviolet absorber in the visible violet wavelengths. Sample 3(c) was spotted, indicating that there was unacceptable phase separation at 20% by weight loading of the D-50. Thus, the coating thickness of Samples 3(a) and 3(b), in microns, shows that even when the coating is relatively thick, the coating composition of the present invention prior to tinting is still transparent.

TABLE II

| Sample | Absorbance at 385 nm | Coating Thickn. | Comments |
|---|---|---|---|
| 3(a) | 1.47 | 6.3 | Lt. Yellow; clear |
| 3(b) | 2.56 | 7.5 | Lt. Yellow; clear |
| 3(c) | 2.9 | 8.3 | Lt. Yellow; spotted |

EXAMPLE 4

Additional samples were prepared in accordance with the present invention using a Lexan LS2-111 polycarbonate substrate, available from General Electric Company in Schenectady, N.Y., which had been primed by dip coating the substrate into SP-6862 primer, available from SDC Coatings, Inc., then air dried for five minutes before heating at 121° C. for 25 minutes. The primed substrate was then flow coated on both sides with a coating composition of the present invention comprising a mixture of 10 SILVUE 339 with the following tintability enhancing compounds (all amounts are percent by weight of total solids):

4(a) 5% UVINUL D-50;
4(b) 5% UVINUL D-50;
4(c) 10% UVINUL D-50;
4(d) 5% TONE 301;
4(e) 5% TONE 301;
4(f) 5% polyethylene glycol (400 mol. wt.) from J. T. Baker;
4(g) 5% polyethylene glycol (400 mol. wt.) from J. T. Baker;
4(h) 5% BEETLE 80;
4(i) none; and
4(j) none.

Samples 4(i) and 4(j) were prepared for comparison purposes using unmodified SILVUE 339 to coat the primed substrate without the addition of any tintability enhancing compounds. After coating, each of the samples was cured for four hours at 127° C.

After curing, the thickness of the coating on the substrates was measured, after which their abrasion resistance and coating adhesion were measured. Coating tintability was tested by measuring the change in light transmittance as a function of immersing the substrates in a BPI Black colored dye bath (1:10 dilution), heated to about 96° C., after 5, 15 and 30 minutes. The following results were observed:

TABLE III

| | 4(a) | 4(b) | 4(c) | 4(d) | 4(e) | 4(f) | 4(g) | 4(h) | 4(i) | 4(j) |
|---|---|---|---|---|---|---|---|---|---|---|
| Coating Thickn., microns | | | | | | | | | | |
| Tinted Sample | — | 3.04 | 2.99 | — | 2.58 | — | 2.91 | — | — | 2.91 |
| Taber Sample | 5.6 | 3.80 | 3.96 | 5.10 | 3.66 | 5.11 | 3.72 | 4.68 | 4.88 | 3.41 |
| Taber Abr. Resist., Δ % H | | | | | | | | | | |
| 100 Revs | 0.7 | 1.1 | 1.4 | 1.6 | 1.2 | 0.7 | 1.4 | 0.7 | 1.4 | 1.3 |
| 500 Revs | 5.2 | 6.8 | 7.8 | 6.6 | 7.0 | 4.2 | 7.4 | 3.6 | 6.2 | 7.6 |
| Initial Cross Hatch, % Adhesion | 100 | 100 | 100 | 100 | 100 | 100 | 100 | 100 | 100 | 100 |
| Initial | | | | | | | | | | |

TABLE III-continued

|  | 4(a) | 4(b) | 4(c) | 4(d) | 4(e) | 4(f) | 4(g) | 4(h) | 4(i) | 4(j) |
| --- | --- | --- | --- | --- | --- | --- | --- | --- | --- | --- |
| L.T., % | 86.5 | 90.4 | 90.1 | 86.6 | 90.9 | 86.9 | 90.9 | 87.0 | 86.5 | 90.9 |
| Y.I. | 4.4 | 3.2 | 3.9 | 0.7 | 0.5 | 0.8 | 0.5 | 1.0 | 0.8 | 0.3 |
| Haze, % | 0.5 | 0.4 | 0.4 | 1.4 | 0.4 | 0.5 | 0.3 | 0.4 | 1.2 | 0.3 |
| Tint (96° C. BPI Black) | | | | | | | | | | |
| Initial L.T., % | 86.8 | 90.8 | 90.4 | 86.6 | 91.1 | 87.1 | 91.1 | 87.2 | 86.6 | 91.1 |
| 5' L.T., % | 77.8 | 77.2 | 61.4 | 63.2 | 68.4 | 65.1 | 62.0 | 74.6 | 73.9 | 83.1 |
| 15' L.T., % | 69.0 | 61.3 | 42.0 | 60.5 | 56.2 | 51.8 | 50.6 | 63.2 | 67.5 | 73.3 |
| 30' L.T., % | 57.2 | 52.4 | 37.3 | 56.5 | 51.7 | 45.8 | 47.4 | 53.6 | 65.3 | 65.9 |
| Cross Hatch, % Adhesion after 30' Tinting | 100 | 100 | 100 | 100 | 100 | 100 | 100 | 100 | 100 | 100 |

As the results show, all of the samples had excellent abrasion resistance. Samples 4(b), 4(c), 4(e), 4(g), and 4(j) were tested in a second batch using the same techniques, and although the data are slightly different than those from the corresponding samples from the first batch, the differences ar well within the range of experimental error. The light transmission of all of the samples was significantly reduced after 30 minutes tinting versus that of the controls, samples 4(i) and 4(j), with sample 4(c) which contained 10% UVINUL D-50 showing particularly surprising improvement after 5 and 15 minutes as well. Sample 4(c) reduced the light transmission to 37.3% after 30 minutes, while samples 4(f) and 4(g), each with 5% polyethylene glycol, reduced the light transmission after 30 minutes to 45.8% and 47.4%, respectively. This compared to 65.3% for sample 4(i) and 65.9% for sample 4(j), neither of which contained a tintability enhancing compound.

Other modifications and variations of the present invention are possible in light of the above teachings. For example, additives and other modifying agents may be added to the compositions of this invention. It is to be understood, however, that changes may be made in the particular embodiments described above which are within the full intended scope of the invention as defined in the appended claims.

We claim:

1. A coating composition which forms a transparent, tintable, abrasion resistant coating upon curing, said coating composition comprising:
   (i) an effective abrasion-resistant amount of a dispersion of a colloidal silica;
   (ii) about 25 to 95 weight percent solids based upon the total solids of (i) and (ii) a partial condensate of a silanol or a blend of silanols, wherein when there is just one silanol it is other than methylsilanol; and
   (iii) at least about 3 percent but less than about 20 percent by weight of total solids of a tintability enhancing compound selected from the group consisting of polyhydroxyl-functional compounds, butylated urea formaldehyde compounds, and mixtures thereof.

2. The coating composition of claim 1, wherein said partial condensate comprises a blend of an epoxy silanol and methylsilanol.

3. The coating composition of claim 1 wherein said polyhydroxyl-functional compounds are selected from the group consisting of tetrahydroxybenzophenone, dihydroxybenzophenone, polyethlyene glycols, polypropylene glycols, polyether polyols, and polyester polyols.

4. The coating composition of claim 3 wherein said polyhydroxyl-functional compound is tetrahydroxybenzophenone.

5. The coating composition of claim 3 wherein said polyhydroxyl-functional compound is a polyethylene glycol.

6. The coating composition of claim 1 wherein said tintability enhancing compound comprises from at least about 5 percent up to about 15 percent by weight of total solids.

7. The coating composition of claim 6 wherein said tintability enhancing compound comprises at least about 10 percent by weight of total solids.

8. The coating composition of claim 4, wherein the tetrahydroxybenzophenone is present in an amount sufficient to absorb at least about 90 percent of incident ultraviolet light at a wavelength of 385 nm.

9. The coating composition of claim 4, wherein said tetrahydroxybenzophenone is present in an amount sufficient to provide an absorbance of at least about 2.0 at 385 nm at a coating thickness on a substrate of less than about 10 microns.

10. The coating composition of claim 1 wherein a colloidal metal oxide is mixed with the colloidal silica.

11. The coating composition of claim 10 wherein said colloidal metal oxide is antimony oxide.

12. A coating composition which forms a transparent, tintable, abrasion resistant coating upon curing, said coating composition comprising:
   (A) a base resin comprising
      (1) about 5 to about 75 weight percent solids, based on the total solids of (A), of a dispersion of a colloidal silica;
      (2) 0 to about 50 weight percent, based on the total solids of (A), of a partial condensate of a silanol or a blend of silanols selected from the group consisting of silanols having the formula
         (a) $R^1Si(OH)_3$ wherein $R^1$ is methyl, and
         (b) $R^2Si(OH)_3$ wherein $R^2$ is selected from a group consisting of vinyl, allyl, phenyl, ethyl, propyl, 3,3,3-trifluoropropyl, gamma-methacryloxy-propyl, gamma-mercaptopropyl and gamma-chloropropyl and mixtures thereof, and wherein when (b) is selected, the amount of (b) in (A) cannot exceed about 10 weight percent based on the total weight of (A);
      (3) about 10 to about 55 weight percent, based on the total solids of (A), of a partial condensate of a silanol of the formula $R^3Si(OH)_3$ wherein $R^3$ is selected from the group consisting of epoxy-functional compounds and mixtures thereof;
   (B) a crosslinker for (A);
   (C) a curing catalyst; and
   (D) at least about 3 percent but less than about 20 percent, by weight of total solids, of a tintability enhancing compound selected from the group consisting of polyhydroxyl-functional compounds and butylated urea formaldehyde compounds.

13. The coating composition of claim 12 wherein said epoxy-functional compounds are selected from the group consisting of

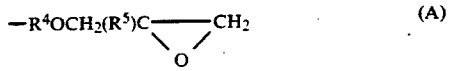   (A)

wherein $R^4$ is an alkylene radical containing 1 to 4 carbon atoms, $R^5$ is a hydrogen atom or an alkyl radical of 1 or 2 carbon atoms, and

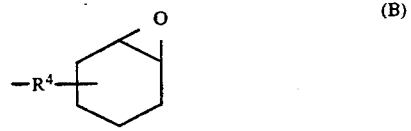   (B)

wherein R has the meaning set forth above.

14. The coating composition of claim 13 wherein (A)(1) is present in an amount from about 30 to about 70 weight percent; (A)(2) is present in an amount from about 5 to about 25 weight percent; and (A)(3) is present in an amount from about 20 to about 40 weight percent, all based on the total weight of (A).

15. The coating composition of claim 13 wherein there is also present sufficient component (B) to react with from about 25 to about 200 percent of available epoxy groups in component (A)(3).

16. The coating composition of claim 13 wherein component (C) is present in an amount from about 0.05 to about 5 percent by weight, based on the total solids of (A), (B), (C), and (D).

17. The coating composition of claim 14 wherein component (A)(2) comprises a partial condensate of a blend of methyl and gamma-methacryloxypropyl silanols.

18. The coating composition of claim 14 wherein component (A)(2) comprises a partial condensate of methylsilanol and (A)(3) comprises a partial condensate of 2-(3,4-epoxycyclohexyl)ethyl silanol.

19. The coating composition of claim 14 wherein component (A)(2) comprises a partial condensate of methylsilanol and (A)(3) comprises a partial condensate of gamma-glycidoxypropylsilanol.

20. The coating composition of claim 15 wherein component (B) is a polycarboxylic acid.

21. The coating composition of claim 16 wherein the catalyst is an amine.

22. The coating composition of claim 16 wherein the catalyst is a diamide.

23. The coating composition of claim 16 wherein the catalyst is an alkali metal salt of a carboxylic acid.

24. The coating composition of claim 13 wherein said polyhydroxyl-functional compounds are selected from the group consisting of tetrahydroxybenzophenone, dihydroxybenzophenone, polyethlyene glycols, polyethylene glycols, polyether polyols, and polyester polyols.

25. The coating composition of claim 13 wherein said polyhydroxyl-functional compound is tetrahydroxybenzophenone.

26. The coating composition of claim 13 wherein said tintability enhancing compound is a polyethylene glycol.

27. The coating composition of claim 13 wherein said tintability enhancing compound comprises at least about 10 percent by weight of said composition.

28. The coating composition of claim 25, wherein the tetrahydroxybenzophenone is present in an amount sufficient to absorb at least about 90 percent of incident ultraviolet light at a wavelength of 385 nm.

29. The coating composition of claim 25 wherein said tetrahydroxybenzophenone is present in an amount sufficient to provide an absorbance of at least about 2.0 at 385 nm at a coating thickness on a substrate of less than about 10 microns.

30. The coating composition of claim 13 wherein a colloidal metal oxide is mixed with the colloidal silica.

31. The coating composition of claim 30 wherein said colloidal metal oxide is antimony oxide.

32. A coating composition which forms a transparent, tintable, abrasion resistant coating upon curing, said coating composition comprising:
(A) a base resin comprising:
(1) about 30 to about 70 weight percent solids, based on the total solids of (A), of a dispersion of a colloidal silica;
(2) about 5 to about 25 weight percent, based on the total solids of (A), of a partial condensate of a silanol or a blend of silanols selected from the group consisting of silanols having the formula
 (a) $R^1Si(OH)_3$ wherein $R^1$ is methyl, and
 (b) $R^2Si(OH)_3$ wherein $R^2$ is selected from the group consisting of vinyl, allyl, phenyl, ethyl, propyl, 3,3,3-trifluoropropyl, gamma-methacryloxy-propyl, gamma-mercaptopropyl and gamma-chloropropyl and mixtures thereof, wherein when (b) is selected, the amount of (b) in (A) cannot exceed about 10 weight percent based on the total weight of (A);
(3) about 20 to about 40 weight percent, based on the total solids of (A), of a partial condensate of a silanol of the formula $R^3Si(OH)_3$, wherein $R^3$ is selected from the group consisting of:

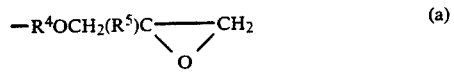   (a)

wherein $R^4$ is an alkylene radical containing 1 to 4 carbon atoms, $R^5$ is a hydrogen atom or an alkyl radical of 1 or 2 carbon atoms, and

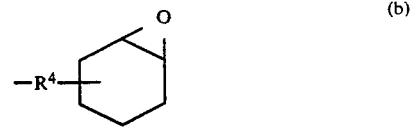   (b)

wherein $R^4$ has the meaning set forth above;
(B) a crosslinker for (A);
(C) a curing catalyst; and
(D) about 5 to about 15 weight percent, based on the total solids in (A), (B), (C), and (D), of tetrahydroxybenzophenone.

33. The coating composition of claim 32 wherein a colloidal metal oxide is mixed with the colloidal silica.

34. The coating composition of claim 33 wherein said colloidal metal oxide is antimony oxide.

35. The coating composition of claim 1, wherein said tintability enhancing compound is a butylated urea formaldehyde compound.

36. The coating composition of claim 13, wherein said tintability enhancing compound is a butylated urea formaldehyde compound.

37. A process for coating a solid substrate with a transparent, tintable, abrasion resistant coating, said process comprising the steps of:
(i) contacting at least one surface of the solid substrate with a coating composition which forms a transparent, tintable, abrasion resistant coating upon curing, said coating composition comprising
(A) a base resin comprising
(1) about 5 to about 75 weight percent solids, based on the total solids of (A), of a dispersion of a colloidal silica;
(2) 0 to about 50 weight percent, based on the total solids of (A), of a partial condensate of a silanol or a blend of silanols selected from the group consisting of silanols having the formula
(a) $R^1Si(OH)_3$ wherein $R^1$ is methyl, and
(b) $R^3Si(OH)_3$ wherein $R^2$ is selected from a group consisting of vinyl, allyl, phenyl, ethyl, propyl, 3,3,3-trifluoropropyl, gamma-methacryloxypropyl, gamma-mercaptopropyl and gamma-chloropropyl and mixtures thereof, and wherein when (b) is selected, the amount of (b) in (A) cannot exceed about 10 weight percent based on the total weight of (A);
(3) about 10 to about 55 weight percent, based on the total solids of (A), of a partial condensate of a silanol of the formula $R^3Si(OH)_3$ wherein $R^3$ is selected from the group consisting of:

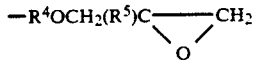 (a)

wherein $R^4$ is an alkylene radical containing 1 to 4 carbon atoms, $R^3$ is a hydrogen atom or an alkyl radical of 1 or 2 carbon atoms, and

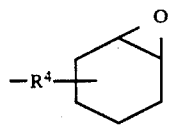 (b)

wherein $R^4$ has the meaning set forth above;
(B) a crosslinker for (A);
(C) a curing catalyst; and
(D) at least about 3 percent but less than about 20 percent, by weight of total solids, of a tintability enhancing compound selected from the group consisting of polyhydroxyl-functional compounds and butylated urea formaldehyde compounds; and
(ii) curing the composition on the solid substrate in a manner such that the cured coating can subsequently be tinted if desired by immersing the coated surface of the substrate in a dye bath for a period of time sufficient for the coating to absorb or transmit to the substrate a desired amount of dye.

38. A coated solid substrate prepared in accordance with the process of claim 37.

39. A coated solid substrate prepared in accordance with the process of claim 37 wherein said solid substrate is transparent.

40. The coated solid substrate of claim 38 wherein the solid substrate is glass.

41. The coated solid substrate of claim 38 wherein the solid substrate comprises a plastic.

42. A method for reducing exposure of an item to ultraviolet light, comprising placing a substrate between said item and a source of ultraviolet light, wherein said solid substrate has been coated on at lest one surface with a transparent, abrasion resistant coating composition which has been cured in accordance with the process of claim 37.

43. A method of reducing exposure of a substrate to ultraviolet light, comprising coating at least one surface of said substrate with a transparent, tintable, abrasion resistant coating composition which has been cured using the process of claim 37, and facing said coated surface towards a source of ultraviolet light.

44. A process for tinting a transparent, tintable, abrasion-resistant coating that is coated on at least one surface of a solid substrate, said process comprising the steps of:
(i) contacting at least one surface of the solid substrate with a coating composition which forms a transparent, tintable, abrasion-resistant coating upon curing, said coating composition comprising:
(A) a base resin comprising:
(1) about 5 to about 75 weight percent solids, based on the total solids of (A), of a dispersion of a colloidal silica;
(2) about 0 to about 50 weight percent, based on the total solids of (A), of a partial condensate of a silanol or a blend of silanols selected from the group consisting of silanols having the formula
(a) $R^1Si(OH)_3$ wherein $R^1$ is methyl; and
(b) $R^2Si(OH)_3$ wherein $R^2$ is selected from a group consisting of vinyl, allyl, phenyl, ethyl, propyl, 3,3,3-trifluoropropyl, gamma-methacryloxyproplyl, gamma-mercaptopropyl and gamma-chloropropyl and mixtures thereof, and wherein when (b) is selected, the amount of (b) in (A) cannot exceed about 10 weight percent based on the total weight of (A);
(3) about 10 to about 55 weight percent, based on the total solids of (A), of a partial condensate of a silanol of the formula $R^3Si(OH)_3$ wherein $R^3$ is selected from the group consisting of:

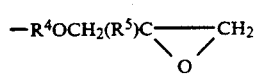 (a)

wherein $R^4$ is an alkylene radical containing 1 to 4 carbon atoms, $R^5$ is a hydrogen atom or an alkyl radical of 1 or 2 carbon atoms, and

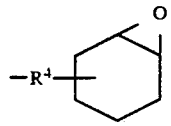 (b)

wherein R⁴ has the meaning set forth above;
(B) a crosslinker for (A);
(C) a curing catalyst; and
(D) at least about 3 percent but less than about 20 percent, by weight of total solids, of a tintability enhancing compound selected from the group consisting of polyhydroxyl-functional compounds and butylated urea formaldehyde compounds;
(ii) curing the coating composition on the solid substrate to form a transparent, tintable, abrasion-resistant coating; and
(iii) tinting the cured coating by immersing the coated surface of the solid substrate in a dye bath for a period of time sufficient for the coating to absorb or transmit to the solid substrate a desired amount of dye.

45. A solid substrate having a tinted coating prepared in accordance with the process of claim 44.

46. The solid substrate having a tinted coating of claim 45, wherein the solid substrate is transparent.

47. The solid substrate having a tinted coating of claim 45, wherein the solid substrate is glass.

48. The solid substrate having a tinted coating of claim 45, wherein the solid substrate is a plastic.

49. The solid substrate having a tinted coating of claim 45, wherein the tintability enhancing compound is a butylated urea formaldehyde compound.

50. A method for reducing exposure of an item to ultraviolet light, comprising placing a solid substrate between the item and a source of ultraviolet light, wherein the solid substrate has been coated on at least one surface placed between the item and the ultraviolet light source with a transparent, tintable, abrasion-resistant coating composition which has been cured and tinted in accordance with the process of claim 44.

51. The method of claim 50, wherein the tintability enhancing compound is tetrahydroxybenzophenone.

52. A method for reducing exposure of a substrate to ultraviolet light, comprising coating at least one surface of a solid substrate with a transparent, tintable, abrasion-resistant coating composition which is cured and tinted in accordance with the process of claim 44, and facing the surface of the substrate having the tinted coating towards a source of ultraviolet light.

53. The method of claim 52 wherein the tintability enhancing compound is tetrahydroxybenzophenone.

* * * * *

UNITED STATES PATENT AND TRADEMARK OFFICE
CERTIFICATE OF CORRECTION

PATENT NO. : 5,013,608

DATED : May 7, 1991

INVENTOR(S) : Allen M. Guest, Martin W. Preus and William Lewis

Page 1 of 2

It is certified that error appears in the above-identified patent and that said Letters Patent is hereby corrected as shown below:

| | |
|---|---|
| Col. 1, line 19: | after "Related" insert -- Art --; |
| Col. 4, line 22: | "(OH)" should be -- $(OH)_3$, --; |
| Col. 6, line 18: | "about 5" should be -- about 55 --; |
| Col. 6, line 26: | "aqueous-suspensions" should be -- aqueous suspensions --; |
| Col. 7, line 17: | "$(CH_3)$" should be -- $(CH_2)$ --; |
| Col. 7, line 54: | "about 2" should be -- about 25 --; |
| Col. 8, line 8: | "15" should be omitted; |
| Col.10, line 8: | "15" should be omitted; |
| Col.10, line 43: | "e.q." should be -- e.g. --; |
| Col.13, line 12: | "!5" should be -- 15 --; |
| Col.16, lines 54-55: | "gamma-methacryloxy-propyl" should be -- gamma-methacryloxypropyl --; |
| Col.17, line 21: | "R" should be -- $R^4$ --; |
| Col.17, lines 60-61: | "polyethylene glycols" should be -- polypropylene glycols --; |
| Col.18, lines 33-34: | "gamma-methacryloxy-propyl" should be -- gamma-methacryloxypropyl --; |
| Col.19, line 24: | "$R^3Si(OH)_3$" should be -- $R^2Si(OH)_3$ --; |
| Col.19, line 44: | "$R^3$" should be -- $R^5$ --; and |
| Col.20, line 14: | "at lest" should be -- at least --. |

UNITED STATES PATENT AND TRADEMARK OFFICE
CERTIFICATE OF CORRECTION

PATENT NO. : 5,013,608
DATED : May 7, 1991
INVENTOR(S) : Allen M. Guest, et al.

It is certified that error appears in the above-identified patent and that said Letters Patent is hereby corrected as shown below:

Column 17, line 60, polyethlyene" should be --Polyethylene--.

Signed and Sealed this

Twelfth Day of January, 1993

Attest:

DOUGLAS B. COMER

Attesting Officer     Acting Commissioner of Patents and Trademarks